US006560334B1

(12) United States Patent
Mullaney et al.

(10) Patent No.: US 6,560,334 B1
(45) Date of Patent: May 6, 2003

(54) TELEPHONE SUBSCRIBER LINE MODULE

(75) Inventors: Julian Sean Mullaney, Raleigh, NC (US); Robert Exum Haas, Jr., Cary, NC (US); Gerald Brent Parker, Durham, NC (US); Ivan Quinones, Foster City, CA (US); Andrew Davis Webb, Cary, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/421,080

(22) Filed: Oct. 19, 1999

Related U.S. Application Data

(62) Division of application No. 08/938,591, filed on Sep. 26, 1997.

(51) Int. Cl.[7] .................................................. H04M 9/00
(52) U.S. Cl. ........................... 379/413.04; 379/413.03; 379/413.02
(58) Field of Search ...................... 379/399.01, 402, 379/404, 412, 413.02, 413.3, 413.04

(56) References Cited

U.S. PATENT DOCUMENTS

| | | | | |
|---|---|---|---|---|
| 4,562,311 A | * | 12/1985 | Dola ..................... | 379/399.01 |
| 4,748,651 A | | 5/1988 | Collins et al. ................ | 379/22 |
| 4,809,323 A | | 2/1989 | Collins et al. ............... | 379/399 |
| 4,979,209 A | | 12/1990 | Collins et al. ............... | 379/399 |
| 5,030,123 A | | 7/1991 | Silver ......................... | 439/188 |
| 5,111,497 A | | 5/1992 | Bliven et al. ................. | 379/27 |
| 5,195,125 A | | 3/1993 | Bliven et al. ................. | 379/29 |
| 5,207,583 A | | 5/1993 | DeBalko et al. .............. | 439/49 |
| 5,219,302 A | | 6/1993 | Shimirak et al. ............. | 439/404 |
| 5,246,383 A | | 9/1993 | Shimirak et al. ............ | 439/521 |
| 5,297,199 A | | 3/1994 | Graham ....................... | 379/399 |
| 5,333,193 A | | 7/1994 | Cote et al. ................... | 379/399 |
| 5,359,654 A | | 10/1994 | Jensen et al. ................ | 379/397 |
| 5,376,019 A | | 12/1994 | Shimirak et al. ............ | 439/521 |
| 5,394,466 A | * | 2/1995 | Schneider et al. ...... | 379/399.01 |
| 5,414,765 A | * | 5/1995 | Lanquist et al. ........ | 379/399.01 |
| 6,028,928 A | * | 2/2000 | Mullaney et al. ....... | 379/399.01 |
| 6,292,558 B1 | * | 9/2001 | Smith ..................... | 379/399.01 |
| 6,307,933 B1 | * | 12/2001 | Stehlin et al. .......... | 379/399.01 |

FOREIGN PATENT DOCUMENTS

| | | |
|---|---|---|
| EP | 0633704 A1 | 11/1995 |
| WO | WO 93/23960 | 11/1993 |

* cited by examiner

*Primary Examiner*—Rexford Barnie
(74) *Attorney, Agent, or Firm*—Myers Bigel Sibley & Sajovec

(57) ABSTRACT

A telephone subscriber module allows a telephone subscriber to selectively interconnect a subscriber telephone line with one of a plurality of available telephone service provider lines. A base has a first jack configured to receive a plug connected to a subscriber telephone line. A second jack, electrically connected to the first jack, is configured to receive a plug connected to a selected one of a plurality of telephone service provider lines to thereby establish an electrical communication connection between the subscriber telephone line and the selected telephone service provider line. The first jack may include a pair of electrical conductors extending outwardly therefrom and terminating in a plug. The plug may be configured to be inserted within a jack adjacent to or remotely located from the first jack to establish an electrical communication connection between a service provider line electrically connected thereto and the subscriber line. A test device may be connected to the first jack for determining whether a fault exists within a selected one of the plurality of service provider lines.

9 Claims, 7 Drawing Sheets

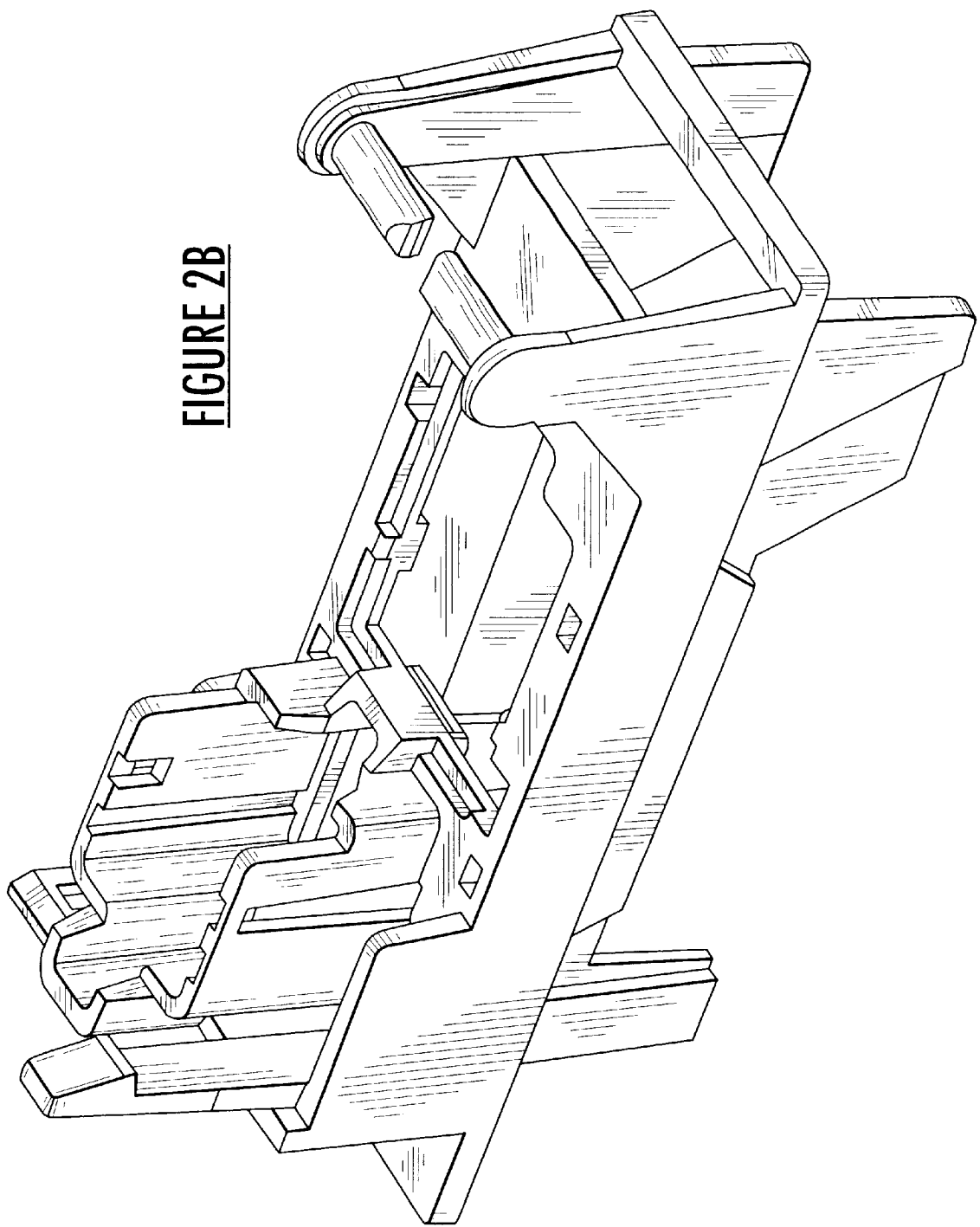

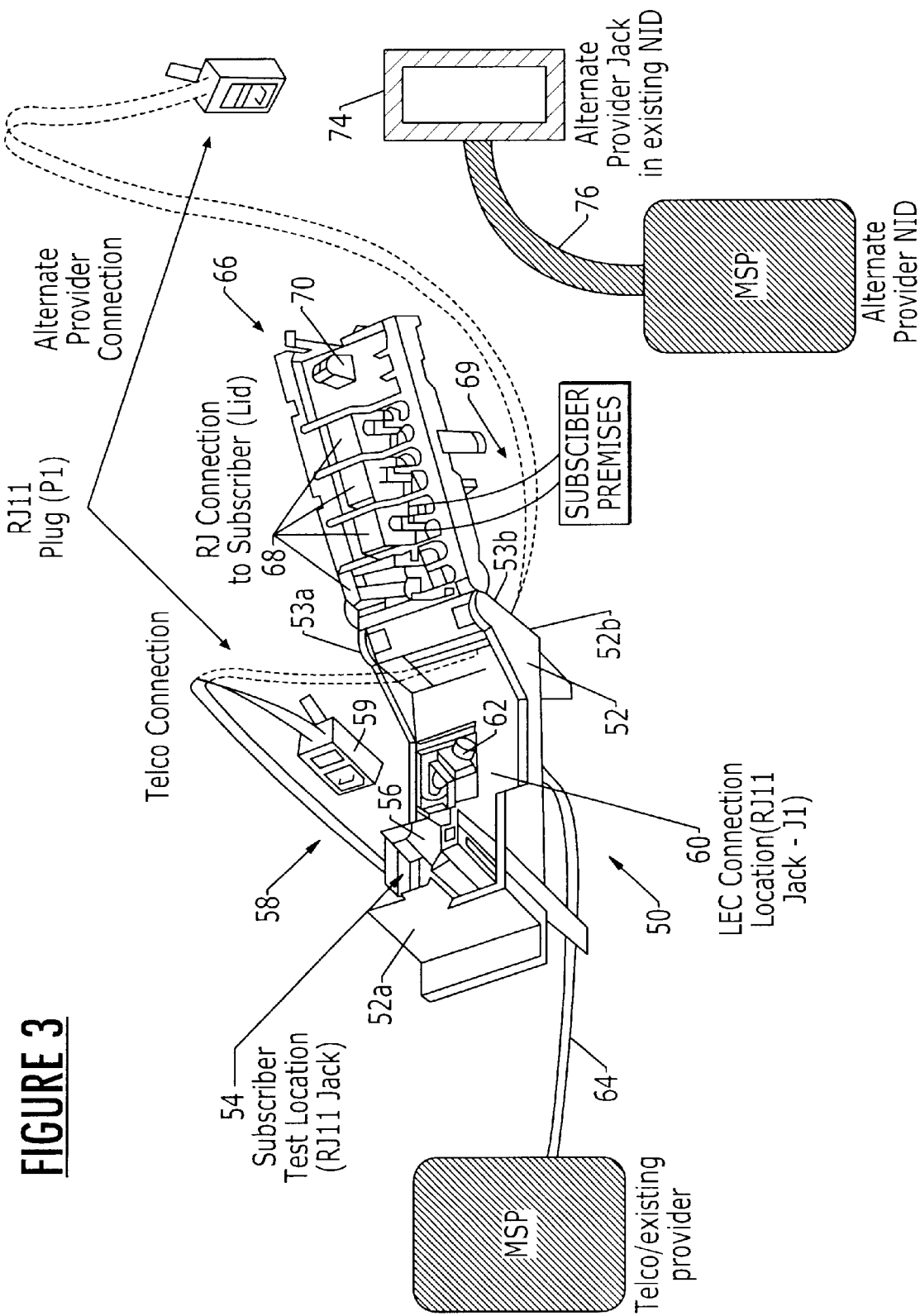

TELEPHONE SUBSCRIBER LINE MODULE

This is a division of application Ser. No. 08/935,591, filed Sep. 26, 1997.

FIELD OF THE INVENTION

This invention relates generally to telephone network interfaces and more particularly to subscriber line modules within telephone network interfaces for interconnecting a telephone service provider line with a telephone subscriber line.

BACKGROUND OF THE INVENTION

A demarcation point, referred to as a network interface device (NID), is typically provided between a telephone subscriber's premises line and an incoming line from a telephone service provider. A device typically used at a NID for physically connecting a subscriber's telephone line with a telephone service provider line is referred to as a "subscriber line module" or "subscriber bridge." A subscriber line module typically includes a jack connected to the incoming telephone service provider line. A plug connected to the subscriber's telephone line is generally located nearby. When the plug of the subscriber's line is inserted into the jack, an interconnection is made between the subscriber's telephone line and the incoming telephone service provider line. When the plug is removed from the jack, a demarcation point is established therebetween. The plug of a test device may be inserted into the jack to facilitate determining whether a fault exists in the incoming telephone service provider's line.

The 1996 Telecommunications Act requires Regional Bell Operating Companies (RBOCs) to give right of entry to alternate telephone service providers. The likely impact of this legislation is that multiple telephone service provider lines will be available within one or more NIDs located at a subscriber's premises so that a subscriber can choose between alternate providers. To comply with the 1996 Telecommunications Act, significant rewiring of a NID may be required in order to allow a subscriber to choose between multiple telephone service provider lines and to allow alternate service providers access to the subscriber premises wiring. Because many NIDs include only a single subscriber line module, the addition of extra subscriber line modules may be necessary. In addition, some way of testing each of the available service provider lines will likely be necessary.

SUMMARY OF THE INVENTION

It is an object of the present invention to provide a telephone subscriber with access to multiple telephone service provider lines within a NID having only one subscriber line module.

It is another object of the present invention to provide a telephone subscriber with access to multiple telephone service provider lines without requiring significant rewiring at the location of a NID.

It is yet another object of the present invention to facilitate the testing of any one of multiple telephone service provider lines within a NID using only one subscriber line module.

These and other objects are accomplished, according to the present invention, by a telephone subscriber module for interconnecting a subscriber telephone line with one of a plurality of available telephone service provider lines. According to one aspect of the present invention, a subscriber telephone line module includes a base with a first jack mounted thereto. A second jack may be mounted to the base and is electrically connected to the first jack. The first jack has a cavity configured to receive a plug which is connected to a subscriber telephone line. The second jack has a cavity configured to receive a plug which is connected to a selected one of a plurality of telephone service provider lines to thereby establish an electrical communication connection between the subscriber telephone line and the selected telephone service provider line. In addition, the cavity of the first jack is configured to removably receive a plug from a test device to facilitate testing the telephone service provider line plugged into the second jack cavity. In one embodiment, a protective sealant material, such as a gel, is disposed within each of the first and second jacks.

In another aspect of the present invention, the telephone subscriber module includes a cover pivotally attached to the base and movable between an open position exposing the first and second jacks and a closed position covering the first and second jacks. A contact electrically connected to a subscriber telephone line is mounted on the cover. The cover contact is configured to be removably inserted within the first jack cavity when the cover is in a closed position to thereby establish an electrical communication connection between the subscriber telephone line and the selected telephone service provider line.

According to a further aspect of the present invention, a telephone subscriber line module includes a base with first and second jacks mounted thereto. The first jack has a cavity configured to receive a plug from a subscriber telephone line. The second jack has a cavity configured to receive a plug from a telephone service provider line. A first pair of electrical conductors are electrically connected to the first jack and extend outwardly therefrom. This first pair of electrical conductors terminate in a first plug that is configured to be inserted within the second jack or within another jack remotely located from the first jack. A second pair of electrical conductors are electrically connected to the second jack and to a telephone service provider line. Thus, when a subscriber line is plugged into the first jack, and when the first plug is inserted within the second jack, an electrical communication connection may be established between the subscriber telephone line and the telephone service provider line. When a subscriber telephone line is plugged into the first jack and when the first plug is inserted within a remotely located third jack, an electrical communication connection may be established between the subscriber telephone line and the telephone service provider line electrically connected to the third jack.

In one embodiment of the present invention, the cavity of the first jack is configured to removably receive a plug from a test device to facilitate testing of the selected telephone service provider line. For example, if the first plug is plugged into the second jack, the test device can test the telephone service provider line electrically connected to the second jack. If the first plug is plugged into a third jack, the test device can test the telephone service provider line electrically connected to the third jack.

The present invention is advantageous because a single telephone subscriber line module provides a telephone subscriber with access to any one of multiple available telephone service provider lines. Furthermore, even though only one subscriber line module is utilized, any one of the selected service provider lines may be tested. The present invention provides a modular connection point allowing telephone subscribers to easily disconnect from one service provider and connect to another without requiring expensive rewiring at the network interface location and without requiring additional subscriber line modules.

BRIEF DESCRIPTION OF THE DRAWINGS

FIG. 2B is a perspective view of a modular base of a subscriber line module.

FIG. 3 is a perspective view of a first embodiment of the unbundled subscriber line module of the present invention.

DETAILED DESCRIPTION OF PREFERRED EMBODIMENTS

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
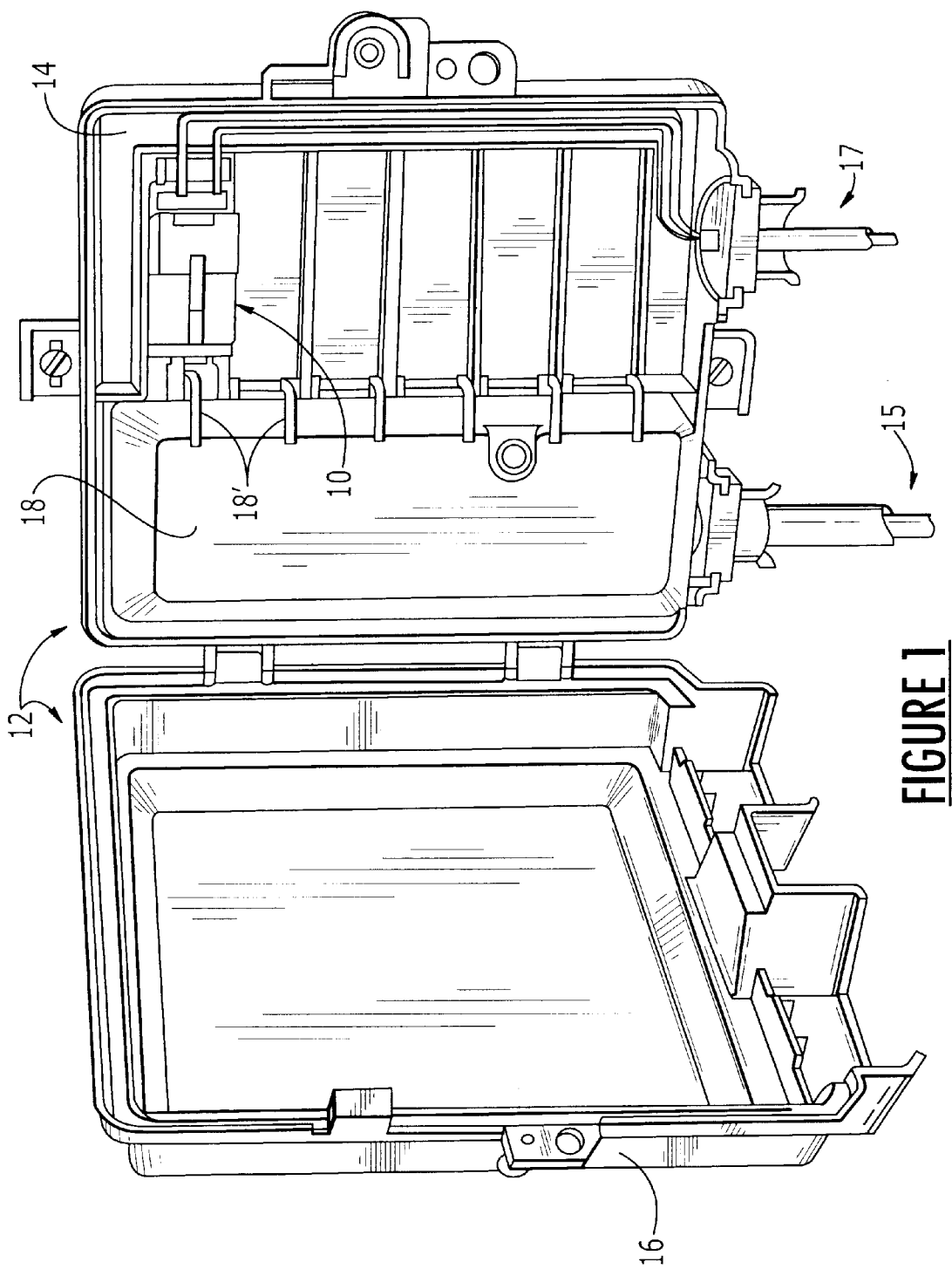
FIG. 1 is a front perspective view of a NID with its housing cover in an open position thereby exposing a telephone subscriber module mounted therewithin.

Referring now to FIG. 1, a telephone subscriber line module 10 is shown mounted within a NID enclosure 12. The illustrated NID enclosure 12 is commonly mounted to a pole or to the outside wall of the premises of a telephone subscriber. The NID enclosure 12 customarily and illustratively includes a base section 14 that is secured in a conventional manner to a subscriber's premises, and to which a telephone subscriber line module is affixed. Telephone service provider lines 15 enter the NID enclosure as shown and are connected to the telephone line 17 of a subscriber's premises via a subscriber line module 10. The NID enclosure 12 customarily and illustratively includes outer and inner lockable door members 16, 18 that pivot relative to the enclosure base section 14 between open and closed positions. A plurality of hook-shaped members 18' are located on the inner door 18. A telephone subscriber can gain access to subscriber components within the NID enclosure 12 by unlocking and opening the outer door 16, but cannot gain access to the telephone service provider's components of the NID since these are overlaid by the inner door 18 that can only be unlocked by the telephone service provider. Subscriber line modules configured in accordance with the various aspects of the present invention may be mounted within various types of NID enclosures, and are not limited to the NID enclosure illustrated in FIG. 1.

Figure 2A:
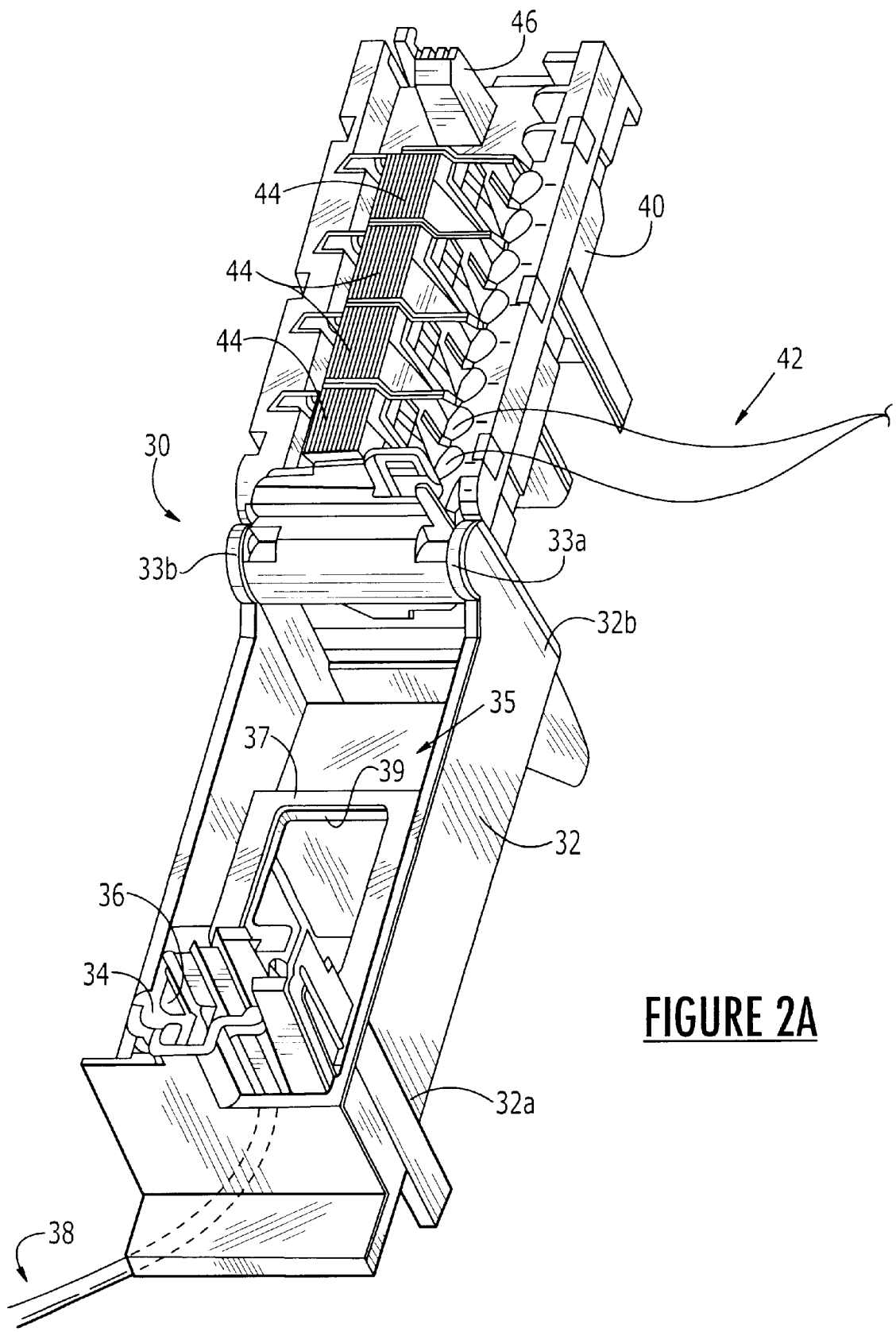
FIG. 2A is a perspective view of a modular and not unbundled subscriber line module.

Referring now to FIG. 2A, a telephone subscriber line module 30, according to an embodiment of the modular base of the present invention, is illustrated. The illustrated telephone subscriber line module 30 includes a generally rectangular base 32 having opposing first and second end portions 32a and 32b, respectively. End portion 32a includes a telephone jack 34 mounted therein. The jack 34 has a cavity 36 configured to removably receive a telephone line plug. Typically, the jack 34 is an RJ11 jack and the telephone line plug to be removably inserted therewithin is an RJ11 plug. However, as would be understood by those skilled in the art, other types of plugs and jacks may be utilized, such as RJ45 plugs and jacks, without departing from the spirit and intent of the present invention. The jack 34 is provided with a pair of electrical conductors 38 for electrically connecting the jack with a telephone service provider line. End portion 32b includes a pair of tabs 33a and 33b extending away from the base 32 in generally parallel spaced apart relationship, as illustrated. The base 32 has a modular configuration permitting the addition of various modules. In the illustrated embodiment, a medial portion 35 of the base 32 includes a flange having a cavity 37 therein. The cavity 37 is configured to receive a telephone jack, such as an RJ11 jack.

The illustrated telephone subscriber line module 30 also includes a cover 40 pivotally attached to the base 32 between the opposing tabs 33a and 33b. The cover 40 is movable between an open position exposing the jack 34 and a closed position covering the jack 34. The cover 40 includes a plurality of connectors 44 to which a respective telephone line 42 within the premises of a subscriber is electrically connected. The cover 40 also includes a plug 46 mounted thereto as illustrated in FIG. 2A. The cover contact 46 is configured to be removably inserted within the cavity 36 of the jack 34 when the cover is in a closed position. When the cover 40 is moved to an open position, the cover contact 46 becomes disengaged from within the jack 34. The cover contact 46 and the connector 44 are electrically connected such that when the cover 40 is in a closed position, an electrical communication connection is established between the subscriber telephone line 42 and the telephone service provider line electrically connected to the jack 34. Also, when the cover 40 is in an open position, a plug from a test device may be inserted within the cavity 36 of the jack 34 to determine if a fault exists within the telephone service provider line.

Figure 2C:
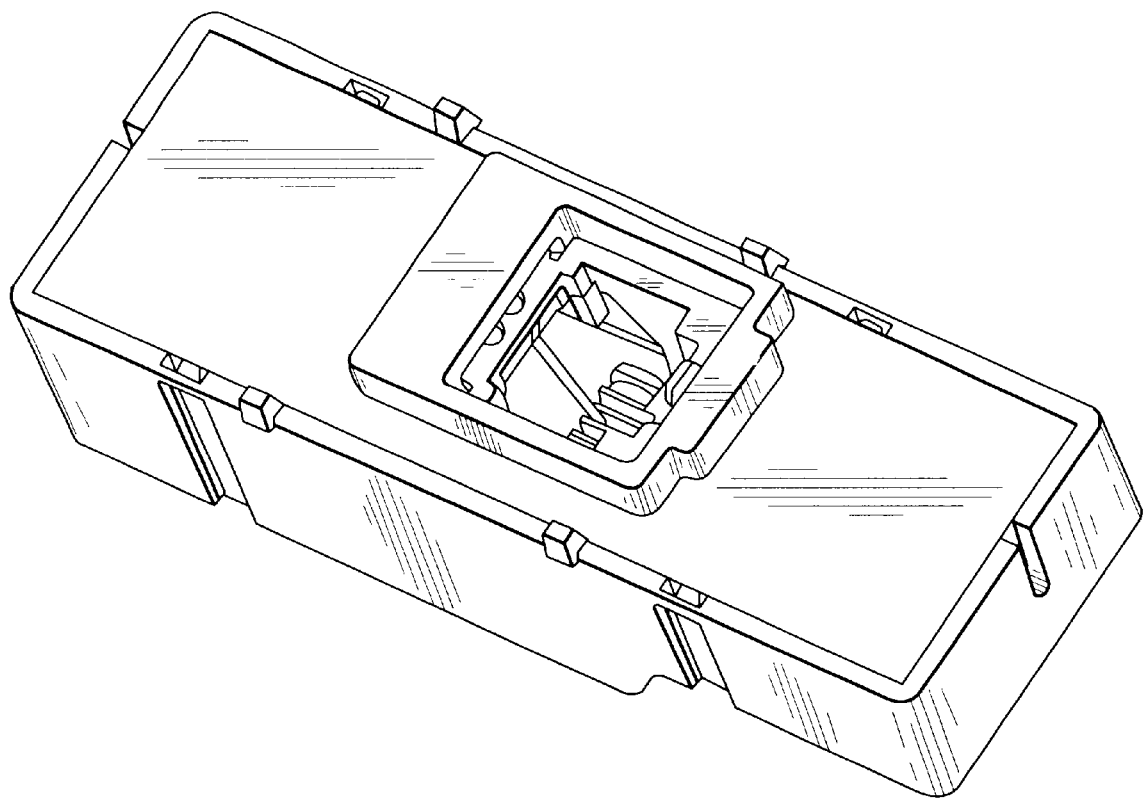
FIG. 2C is a perspective view of a sealed electronics portion of a subscriber line module.
Figure 2D:
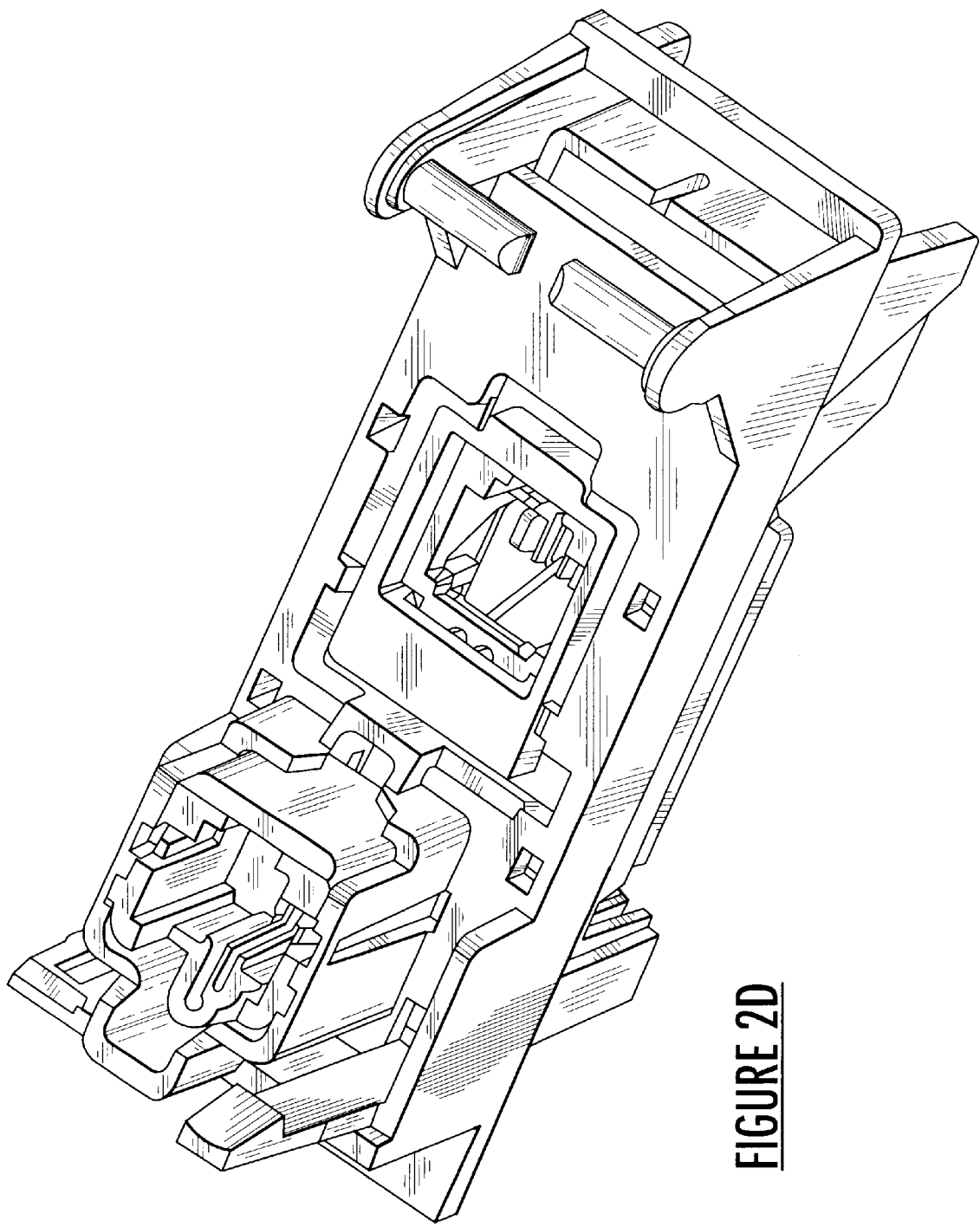
FIG. 2D is a perspective view of a modular base of a subscriber line module with the sealed electronics portion of FIG. 2C installed.

FIGS. 2B–2D illustrate various aspects of the modular subscriber line module of the present invention. FIG. 2B is a perspective view of a modular base of a subscriber line module. The base can be hard-wired to an existing RJ11, or an existing RJ11 may have a plug attached to wires allowing for modular connection to any female RJ jack. FIG. 2C is a perspective view of a sealed electronics portion of a subscriber line module. The illustrated portion can reside underneath a subscriber bridge and is designed to snap into place therein. FIG. 2D is a perspective view of a modular base of a subscriber line module with the sealed electronics portion of FIG. 2C installed.

Referring now to FIG. 3, a telephone subscriber line-module 50 according to one embodiment of the unbundled provider aspect of the present invention is illustrated. The illustrated telephone subscriber line module 50 includes a base 52 having opposing first and second end portions 52a and 52b, respectively. End portion 52a includes a first telephone jack 54 mounted thereto. The first jack 54 has a cavity 56 configured to removably receive a telephone line plug. Preferably, the first jack is an RJ11 jack and its cavity 56 is configured to removably receive an RJ11 plug therewithin. Extending from the first jack 54 is a pair of electrical conductors 58 which terminate in a first plug 59 for electrically connecting the first jack 54 with a telephone service provider line, either via a second jack 60 positioned adjacent the first jack or via a third jack 74 remotely located from the telephone subscriber line module 50, as described in detail below. End portion 52b includes a pair of tabs 53a and 53b extending away from the base 52 in generally parallel spaced apart relationship, as illustrated.

In the illustrated embodiment, a second jack 60 is mounted to the base 52 and has a cavity 62 configured to receive a telephone plug therewithin. Jack 60 is mounted in a medial portion of the modular base 52 as described previously with reference to FIG. 2A. Preferably, the second jack 60 is an RJ11 jack and its cavity 62 is configured to removably receive an RJ11 plug therewithin. A second pair of electrical conductors 64 electrically connects the second jack 60 to a first telephone service provider line.

The illustrated telephone subscriber line module 50 also includes a cover 66 pivotally attached to the base 52 between opposing tabs 53a and 53b. The cover 66 is movable between an open position exposing the first and second jacks 54 and 60, and a closed position covering the first and second jacks 54 and 60. The cover 66 includes a connector 68 to which a telephone line 69 within the premises of a subscriber is electrically connected. As illustrated in the embodiment of FIG. 3, a plurality of connectors 68 are positioned on cover 66 allowing connection to a plurality of telephone lines 69. The cover 66 also includes a contact 70 mounted thereto, as illustrated in FIG. 3. The cover contact 70 is configured to be removably inserted within the cavity 56 of the first jack 54 when the cover 66 is in a closed position. When the cover 66 is moved to an open position, the cover contact 70 is configured to become disengaged from within the cavity 56 of the first jack 54. The cover contact 70 and the connector 68 are electrically connected such that when the cover 66 is in a closed position, and when plug 59 is inserted within the cavity 62 of the second jack 60, an electrical communication connection is established between the subscriber telephone line 69 and the first telephone service provider line 64 electrically connected to the second jack 60.

The configuration of the telephone subscriber line module 50 illustrated in FIG. 3 allows a telephone subscriber to easily interconnect with any one of a plurality of telephone service provider lines. For example, in the illustrated embodiment of FIG. 3, the second jack 62 is electrically connected to a first telephone service provider line 64. When the first plug 59 is inserted within the second jack 60, and when the cover 66 is in a closed position, the cover contact 70 is inserted within the first jack 54 to thereby establish an electrical communication connection between the subscriber telephone line 69 and the first telephone service provider line 64. However, by disconnecting the first plug 59 from the second jack 60 and inserting the first plug 59 in a third jack 74, an electrical communication connection is established between the subscriber telephone line 69 and the second telephone service provider line 76 electrically connected to the third jack 74 when the cover 66 is in a closed position.

The third jack 74 may be located within the same NID containing the telephone subscriber line module 50, or may be within a NID located remotely therefrom. Preferably, the pair of electrical conductors 58 electrically connected to the first jack 54 are configured to extend outwardly from the telephone subscriber module 50 so that the first plug 59 can be inserted within a cavity of any jack located within near proximity of the telephone subscriber module.

Figure 4:
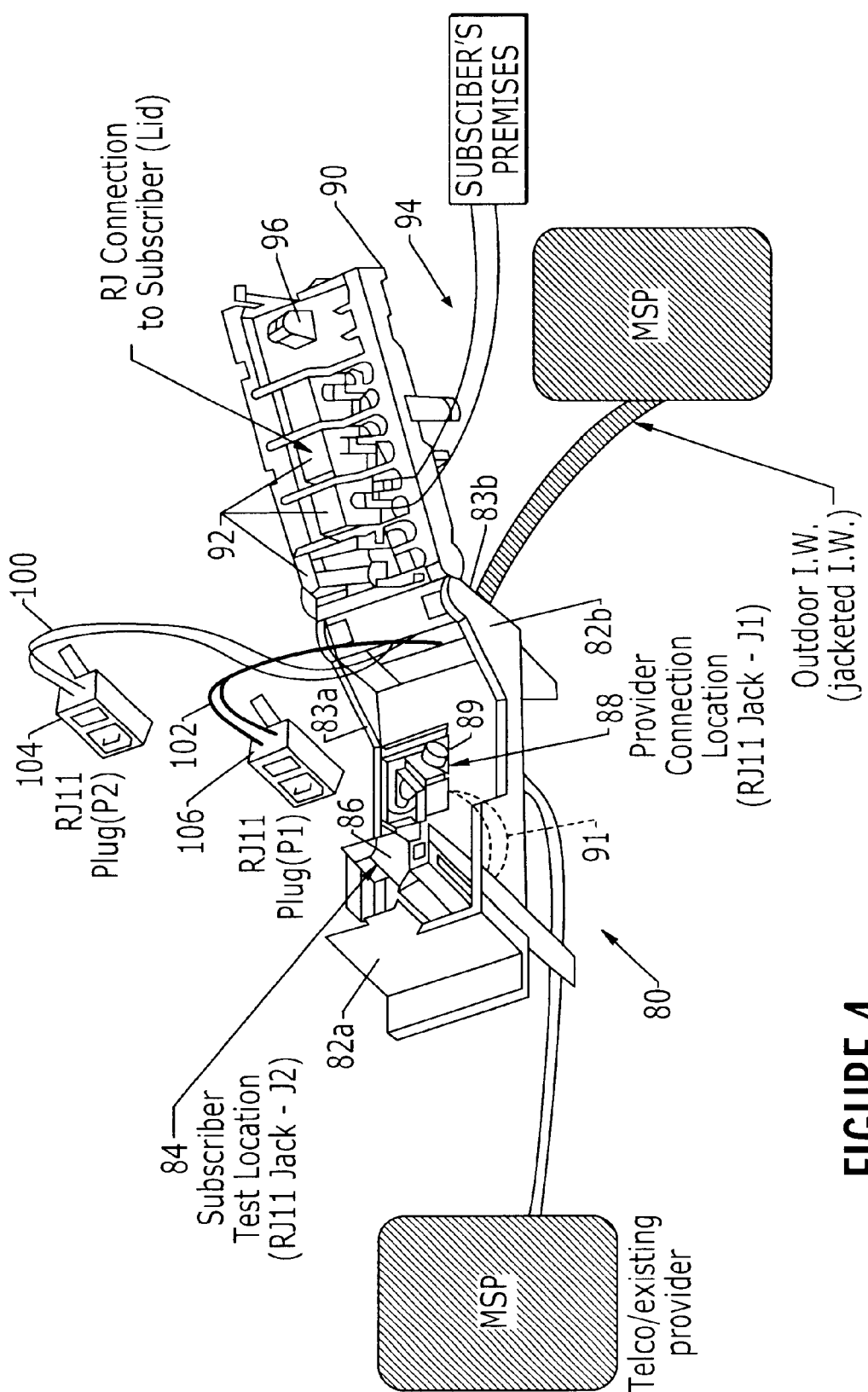
FIG. 4 is a perspective view of a second embodiment of the unbundled subscriber line module of the present invention.

Referring now to FIG. 4, a telephone subscriber line module 80 according to another embodiment of the unbundled provider aspect of the present invention is illustrated. The illustrated telephone subscriber line module 80 includes a base 82 having opposing first and second end portions 82a and 82b, respectively. End portion 82a includes a first telephone jack 84 mounted thereto. The first jack 84 has a cavity 86 configured to removably receive a telephone line plug. Preferably, the first jack 84 is an RJ11 jack and its cavity 86 is configured to removably receive an RJ11 plug therewithin. A second jack 88 is mounted to the base 82 adjacent the first jack 84, as illustrated and described previously in connection with the modular base aspect of the present invention. Preferably, the second jack 88 is an RJ11 jack and its cavity 86 is configured to removably receive an RJ11 plug therewithin. The first and second jacks 84 and 88 are electrically connected to each other via a pair of electrical conductors 90. End portion 82b includes a pair of tabs 83a and 83b extending away from the base 82 in generally parallel spaced apart relationship, as illustrated.

The illustrated telephone subscriber line module 80 also includes a cover 90 pivotally attached to the base 82 between opposing tabs 83a and 83b. The cover 90 is movable between an open position exposing the first and second jacks 84 and 88, and a closed position covering first and second jacks 84 and 88. The cover 90 includes a connector 92 to which a telephone line 94 from within the premises of a subscriber is electrically connected. As illustrated in FIG. 4, a plurality of insulation displacement connectors 92 are provided for connecting to a plurality of telephone lines 94. The cover 90 also includes a contact 96 mounted thereto as illustrated in FIG. 4. The cover contact 96 is configured to be removably inserted within the cavity 86 of the first jack 84 when the cover 90 is in a closed position. When the cover 90 is moved to an open position, the cover contact 96 is configured to become disengaged from within the cavity 86 of the first jack 84. The cover contact 96 and the connector 92 are electrically connected such that when the cover 90 is in a closed position, an electrical communication connection is established between the subscriber telephone line 94 and a telephone service provider line inserted within the cavity 89 of the second jack 88.

The configuration of the telephone subscriber line module illustrated in FIG. 4 allows a telephone subscriber to easily interconnect with any one of a plurality of telephone service provider lines provided in proximity to the telephone subscriber line module 80. For example, in the illustrated embodiment of FIG. 4, two incoming telephone service provider lines 100 and 102 are illustrated. The incoming telephone service provider lines 100 and 102 terminate in plugs 104 and 106, respectively, each of which is configured to be removably inserted within the cavity 89 of the second jack 88. Thus, when the cover 90 is in a closed position, an electrical communication connection is established between the subscriber telephone line 94 and the selected telephone service provider line plugged into the second jack 88.

It is to be understood that the various aspects of the present invention can be carried out utilizing subscriber line modules not having a cover contact configured to be inserted within the cavity of a jack mounted to the subscriber line module. For example, with respect to the aspect of the present invention illustrated in FIG. 3, the telephone line 69 within the premises of a subscriber may terminate in a plug which is configured to be inserted within the cavity 56 of the first jack 54. When the telephone line 69 of the subscriber's premises is electrically connected to the first jack 54 via a plug inserted within the first jack cavity 56, an electrical communication connection is established between the telephone subscriber line 69 and the telephone service provider line electrically connected to the pair of conductors 58 extending from the first jack 54. In this configuration, the cover 66 serves only a protective function and does not establish an electrical communication connection between the telephone subscriber line 69 and the telephone service provider line electrically connected to the pair of conductors 58.

With respect to the embodiment of the present invention illustrated in FIG. 4, the telephone line 94 within the subscriber's premises can be electrically connected to the first jack 84 via a plug inserted within the first jack cavity 86. An electrical communication connection is then established between the telephone subscriber line 94 and the telephone service provider line plugged into the second jack 88. In this configuration, the cover 90 serves only a protective function and does not establish an electrical communication connection between the telephone subscriber line 94 and the telephone service provider line electrically connected to the second jack 88.

For each of the embodiments of the present invention illustrated in FIGS. 3 and 4, when the cover is in an open position, a demarcation is established between the telephone line within a subscriber's premises and a telephone service provider line. The plug of a test device can be inserted within the cavity of the first jack 54, 84 of each respective embodiment to determine if a fault exists in a telephone service provider line electrically connected with each respective subscriber line module. Additionally, for each of the embodiments of the present invention illustrated in FIGS. 3 and 4, it is preferable that a protective sealant material be disposed within the cavity of each jack mounted to the respective subscriber line module. A particularly preferred material is a gel such as silicone, polyurethane or thermoplastic elastomer, and usable as disclosed generally in U.S. Pat. Nos. 4,634,207 and/or 4,864,725, the disclosures of which are incorporated herein by reference.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A telephone subscriber module for interconnecting a subscriber telephone line with one of a plurality of incoming telephone service provider lines, the telephone subscriber module comprising:
   a base;
   a first RJ jack mounted to said base, wherein said first RJ lack comprises a first cavity configured to receive an RJ plug;
   a second RJ jack mounted to said base in spaced-apart relationship with said first RJ lack, wherein said second RJ lack comprises a second cavity configured to receive an RJ plug from a selected one of the plurality of incoming telephone service provider lines, and wherein said second RJ jack is electrically connected to said first RJ jack; and
   a cover pivotally attached to said base and movable between an open position exposing said first and second RJ jacks and a closed position covering said first and second RJ jacks, wherein said cover comprises a contact electrically connected to the subscriber telephone line, and wherein said cover contact is configured to be removably inserted within said first RJ lack cavity when said cover is in the closed position to establish electrical communications between the subscriber telephone line and one of the plurality of incoming telephone service provider lines having an RJ plug inserted within said second RJ jack cavity.

2. A telephone subscriber module according to claim 1, wherein said cavity of said first RJ jack is configured to removably receive a plug from a test device to facilitate testing a telephone service provider line having a plug inserted within said second RJ jack cavity.

3. A telephone subscriber module according to claim 1, wherein said first and second RJ jacks are RJ11 jacks.

4. A telephone subscriber module according to claim 1, wherein a protective sealant material is disposed within at least one of said first and second RJ jacks.

5. A telephone network interface device, comprising:
   a housing; and
   a telephone subscriber module removably mounted within said housing for interconnecting a subscriber telephone line with one of a plurality of incoming telephone service provider lines, the telephone subscriber module comprising:
   a base;
   a first RJ jack mounted to said base, wherein said first RJ jack comprises a first cavity configured to receive an RJ plug;
   a second RJ jack mounted to said base in spaced-apart relationship with said first RJ jack, wherein said second RJ jack comprises a second cavity configured to receive an RJ plug from a selected one of the plurality of incoming telephone service provider lines, and wherein said second RJ jack is electrically connected to said first RJ jack; and
   a cover pivotally attached to said base and movable between an open position exposing said first and second RJ jacks and a closed position covering said first and second RJ jacks, wherein said cover comprises a contact electrically connected to the subscriber telephone line, and wherein said cover contact is configured to be removably inserted within said first RJ jack cavity when said cover is in the closed position to establish electrical communications between the subscriber telephone line and one of the plurality of incoming telephone service provider lines having an RJ plug inserted within said second RJ jack cavity.

6. A telephone network interface device according to claim 5 wherein said first and second RJ jacks are RJ-11 jacks.

7. A telephone network interface device according to claim 5, wherein a protective seal ant material is disposed within at least one of said first and second RJ jacks.

8. A telephone network interface device according to claim 7, wherein said protective sealant material is a gel.

9. A telephone network interface device according to claim 5 wherein said cavity of said first RJ jack is configured to removably receive a plug from a test device to facilitate testing a telephone service provider line having a plug inserted within said second RJ jack cavity.

* * * * *